United States Patent
Brandt et al.

[11] Patent Number: 5,238,334
[45] Date of Patent: Aug. 24, 1993

[54] CERAMIC WHISKER-REINFORCED CUTTING TOOL WITH PREFORMED CHIPBREAKERS FOR MACHINING

[75] Inventors: N. Gunnar Brandt, Solna; Jorgen V. Wiman, Sandviken, both of Sweden

[73] Assignee: Sandvik A.B., Sandviken, Sweden

[21] Appl. No.: 846,911

[22] Filed: Mar. 6, 1992

[30] Foreign Application Priority Data

Mar. 6, 1991 [SE] Sweden .............................. 9100675

[51] Int. Cl.⁵ ............................................. B23B 27/16
[52] U.S. Cl. ..................................... 407/116; 51/308; 407/119; 501/89
[58] Field of Search .......................... 407/114–116, 407/119; 408/144, 145; 51/293, 307–309; 501/89, 90

[56] References Cited

U.S. PATENT DOCUMENTS

| | | | |
|---|---|---|---|
| 4,579,703 | 4/1986 | Adlerborn et al. | 264/58 |
| 4,615,990 | 10/1986 | Richon et al. | 501/92 |
| 4,707,332 | 11/1987 | Huether | 419/28 |
| 4,789,277 | 12/1988 | Rhodes et al. | 409/131 |
| 4,801,224 | 1/1989 | Pettersson et al. | 407/110 |
| 4,849,142 | 7/1989 | Panda et al. | 264/40.6 |
| 4,867,761 | 9/1989 | Brandt et al. | 51/309 |
| 4,889,835 | 12/1989 | Niihara et al. | 501/89 |
| 4,920,838 | 5/1990 | Brandt et al. | 82/1.11 |
| 4,959,331 | 9/1990 | Mehrota et al. | 501/89 |
| 4,961,757 | 10/1990 | Rhodes et al. | 51/309 |
| 4,988,242 | 1/1991 | Pettersson et al. | 407/114 |
| 5,116,167 | 5/1992 | Niebauer | 407/116 X |

OTHER PUBLICATIONS

Terry N. Tiegs et al, "Sintered $Al_3O_3$–SiC–Whisker Composites", Ceramic Bulletin, vol. 66, No. 2, pp. 339–342.

A. M. Wolf, *Metal Cutting*, second edition, revised and amplified, Leningrad, Machinostroyenie, Leningrad Division, 1973, pp. 51–52.

*Primary Examiner*—Steven C. Bishop
*Attorney, Agent, or Firm*—Burns, Doane, Swecker & Mathis

[57] ABSTRACT

The present invention discloses a ceramic cutting tool insert for chip-cutting machining. It comprises a body of generally polygonal or round shape having an upper face, an opposite face and at least one clearance face intersecting upper and lower faces to define cutting edges. The ceramic material is alumina based and comprises at least 10–40 volume % single crystal whiskers and/or platelets of carbides, nitrides and/or borides of Si, Ti, Zr, Hf, Ta and/or Nb or solid solutions thereof. The non-plane chip-forming surfaces of the insert comprise recessions and elevations that are formed in an uniaxial cold pressing operation.

10 Claims, 2 Drawing Sheets

0.7X 0.7X

CERAMIC WHISKER-REINFORCED CUTTING TOOL WITH PREFORMED CHIPBREAKERS FOR MACHINING

BACKGROUND OF THE INVENTION

The present invention relates to ceramic cutting tool inserts and, in particular, to such cutting tool inserts in which monocrystalline whiskers (hair crystals) and/or platelets are homogeneously distributed in an oxide based ceramic matrix, the inserts having preformed chipbreakers for machining of long-chipping materials.

Ceramic cutting materials have now been available for several decades but have not, until recently, had any commercial importance for use in chip-forming machining. The main reason for the limited growth of ceramic cutting tools has been their sudden and unexpected failures because of their inherent inadequate strength and toughness.

During the last decade, the properties of ceramic cutting materials have been improved in many respects resulting in an increased relative share in the cutting of cast iron and nickel-based high-temperature alloys.

During the very recent years, the incorporation of whiskers, or single crystal fibers, has enabled the use of ceramic cutting tools not only in heat resistant alloys but also in the machining of steel, a material which makes extreme simultaneous demands upon strength, toughness, thermal shock and wear resistance.

The latter application, as well as the cutting of heat resistant alloys to some extent, put demands on the chipbreaking capability of the insert. Steel machining generally produces continuous long chips, which unless broken, will create severe problems during the machining operation as they can interfere with all rotating parts and also damage the surface finish of the machined part.

Up till now, this has not been a problem since almost all machining with ceramic tools has been made in workpiece materials producing short interrupted chips, i.e., cast iron. Generally, ceramic inserts also have all surfaces ground flat. In case chipbreaking is necessary, a loose (or separate) chipbreaker normally is attached to the tool holder. A simple chipbreaking geometry may also be ground on the insert.

Now with more tough ceramic materials available, it is not only possible but also necessary to be able to produce more complex shaped insert styles in order to utilize the full potential of the cutting tool materials.

Since the improved properties of more recently developed ceramic materials have been obtained using rather large additions of whiskers, however the processing is not straight-forward. Whisker additions normally mean that simultaneous application of high temperature and pressure is necessary to completely consolidate the material.

Densification of pressed powder-whisker compacts is inhibited because rearrangement of whiskers during shrinkage is difficult. With whisker contents > 10 volume %, densification is severely inhibited and sintered materials without closed porosity is obtained, (see T. Tiegs and P. Becher, "Sintered Alumina-Silicon Carbide Whisker Composites", Am. Cer. Soc. Bull., 66(2), 339–342 (1987)).

For metal cutting purposes, whisker contents in the order of 25–35% by volume is necessary to obtain the requested levels of strength, toughness and thermal shock resistance. It is thus necessary to consolidate the material using simultaneously a high temperature and a high pressure.

Uniaxial hot pressing which is the most frequent method for consolidation of difficult to sinter ceramic materials is not applicable in this case since this method can only produce fairly simple geometrical shapes.

Hot isostatic pressing using gas as the pressure medium is further also not applicable since a closed porosity is needed unless the material to be sintered is enclosed in a can. The canning material can be a metal, glass or some other material that can be attached onto the surface of the perform to form a coating which is not penetrable by the gas.

OBJECTS AND SUMMARY OF THE INVENTION

It is an object of this invention to avoid or alleviate the problems of the prior art. It is also an object of the invention to provide a whisker reinforced ceramic cutting insert which can be used in the machining of steel or heat resistance workpieces without interfering with the machining operation.

In one aspect of the invention there is a ceramic cutting tool insert for chipcutting machining comprising a body of generally polygonal or round shape having an upper face, an opposite face and at least one clearance face intersecting the said upper and lower faces to define cutting edges, the ceramic material comprising alumina and 10–40 volume % single crystal whiskers and/or platelets of carbides, nitrides and/or borides of Si, Ti, Zr, Hf, Ta and/or Nb or solid solutions thereof, the non-plane chip-forming surfaces of the insert comprising recessions and elevation formed in an uniaxial cold pressing operation.

In another aspect of the invention there is provided a method of making a cutting insert comprising forming a cutting insert blank from a mixture comprising alumina and 10–40 volume % of single crystal whiskers and/or platelets of carbides, nitrides and/or borides of Si, Ti, Zr, Hf, Ta nd/or Nb or solid solutions thereof by a uniaxial cold pressing operation and sintering in an isostatic pressing operation using gas as a pressure transmitting medium while the insert in encapsulated in a glass coating impermeable to the gas.

In yet another aspect of the invention there is provided a method of cutting steel or heat resistant alloys wherein a cutting tool comprising alumina and 10–40 volume % of single crystal whiskers and/or platelets of carbides, nitrides and/or borides of Si, Ti, Zr, Hf, Ta nd/ or Nb or solid solutions thereof is brought into contact with a steel or heat resistant alloy workpiece and at least one of the cutting tool and workpiece moves relative to the other whereby material is removed by the cutting tool from the steel or heat resistant alloy workpiece, said cutting tool containing non-plane chip-forming surfaces comprising recessions and elevations, said non-plane chip-forming surfaces being formed in a uniaxial cold pressing operation.

It has now turned out surprisingly that if whisker reinforced ceramic inserts containing pressed in chipbreakers are made using isostatic or pseudoisostatic pressure conditions not only adequate tool life is obtained but also the chipbreaking capability is increased to that extent that the inserts fulfill the requirements for production with limited manning.

DETAILED DESCRIPTION OF THE PREFERRED EMBODIMENTS OF THE INVENTION

Figure 7:
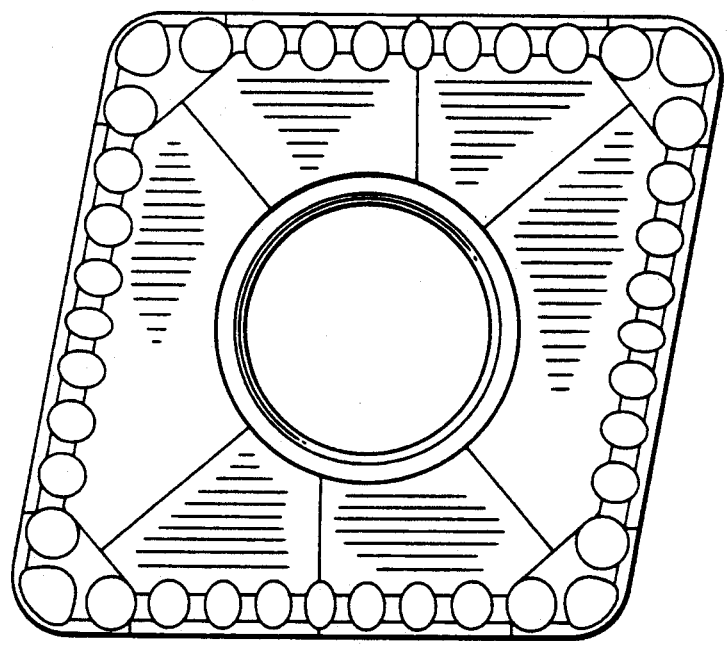
FIG. 7 is a representation of a cutting insert which may be used in the machining operation of FIG. 1.
Figure 8:
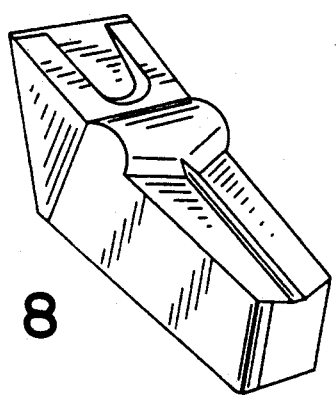
FIG. 8 is a representation of a cutting insert which may be used in the machining operation of FIG. 4.

The whisker reinforced tool insert of a ceramic material for chip-cutting machining according to the invention (see FIGS. 7 and 8) comprises a body of generally polygonal or round shape (FIG. 7, which is an insert of U.S. Pat. No. 4,988,242, hereby incorporated by reference) or of rectilinear shape (FIG. 8, which is an insert of U.S. Pat. No. 4,801,224, hereby incorporated by reference). In each instance, the insert has an upper face, an opposite face and at least one clearance face intersecting upper and lower faces to define cutting edges. Said upper face is provided with a chip-shaping groove confined by rib means extending longitudinally away from said cutting edge. Said rib means comprises a pair of oppositely disposed spaced apart ribs and, if desired, a central rib located between said ribs. In addition, a land surface is provided between said cutting edge and said chipbreaking groove. Furthermore, one or several circular or semi-circular projections can be arranged in said chipbreaking groove to enable a chip to be satisfactorily broken over wide ranges of cut and feed. Preferably, in the case of the insert of FIG. 7, a row of projections is positioned substantially parallel to adjacent cutting edges.

The ceramic material is preferably alumina-based and comprises 10–40% by volume, preferably 25–35% by volume, of single crystal whiskers and/or platelets of carbides, nitrides and/or borides of Si, Ti, Zr, Hf, Ta and/or Nb or solid solutions thereof. The whisker material consists of monocrystals with a diameter of 0.2–10 $\mu$m and a length of 2.5–100 $\mu$m and a length/diameter ratio that is preferably 5–10. The platelets consist of platelike monocrystals with an average diameter of <20 $\mu$m and a thickness of <5 $\mu$m. The grain size of the matrix is <10 $\mu$m, preferably <4 $\mu$m. The oxide matrix is essentially ceramic oxides or ceramic oxides mixed with hard carbides and/or nitrides and/or borides and/or binder metal. Preferably, the ceramic matrix shall contain <20% by volume of $ZrO_2$.

The shape of non-plane chip-forming surfaces of the insert comprising recessions and elevations is formed in the pressing operation and during the sintering the insert shrinks to final shape and dimension. After sintering, only minor grinding operations to form the cutting edge are necessary. Sintering is performed at high temperature, >1400° C., and pressure >25 MPa, during isostatic or pseudoisostatic conditions.

In a specific embodiment, the insert is made by isostatic pressing with gas as pressure transmitting medium and with the insert encapsulated in glass. The pressed insert is first covered with an intermediate coating by dipping into a slurry of the components of the coating. The purpose of the intermediate coating is to prevent that the glass enters the preform and reacts with it. During the dipping into the slurry, the pore system of the preform is held and evacuated by a suction cup as disclosed in U.S. patent application Ser. No. 07/828,952, filed Feb. 10, 1992, and herein incorporated by reference. Outside this coating, a further coating of a glass or glass-forming mixture is applied which after heating is made impermeable to the gas. The insert is then sintered isostatically to an essentially dense body.

In an alternative embodiment, the preform is consolidated by placing it in a powder which is contained in a closed compressible container or in a tool for uniaxial pressing. A pressure is then applied on the container either uniaxially or isostatically or alternatively uniaxially on the tool and the powder acts as a pressure transmitting medium to create isostatic or pseudoisostatic conditions during the heating which can be performed using conventional convection or induction heat sources or microwave heating.

The invention is additionally illustrated in connection with the following Examples which are to be considered as illustrative of the present invention. It should be understood, however, that the invention is not limited to the specific details of the Examples.

The invention is further illustrated in the following examples but is not limited to the geometrical configurations shown in these.

EXAMPLE 1 (Comparative)

Figure 1:
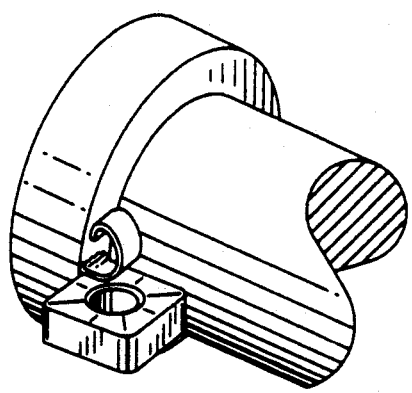
FIG. 1 shows a steel machining operation.

A mixture of $Al_2O_3$ and 15 volume % $ZrO_2$, a material that can be easily pressureless sintered, and also gives reasonable tool lives in steel machining was uniaxially cold pressed in a preform to obtain a special geometry CNMG 120412 (FIG. 1 and FIG. 7) designed for steel machining at high cutting speeds. The pressed preform was sintered at 1600° C. in air and then post-HIPped at 1550° C. at 200 MPa in Ar-gas to 99.9% of theoretical density. The only operation after sintering was an edge rounding to approximately 50 $\mu$m.

EXAMPLE 2 (Comparative)

A mixture of $Al_2O_3$ and 30 volume % TiN-whiskers, a material that cannot be pressureless sintered, was uniaxially hot-pressed at 1550° C. at 28 MPa to 99.8% of therorretical density into a billet which was then cut into suitable blank sizes for grinding of insert style CNGA 120412 (ISO designation). The insert was ground on all surfaces.

EXAMPLE 3

A mixture of $Al_2O_3$ and 30 volume % TiN-whiskers was uniaxially cold pressed in a preform to obtain, after sintering, a special geometry CNMG 120412 (FIG. 1) designed for steel machining at high cutting speeds. The preform was heated to 1575° C. in a protective gas atmosphere and then inserted in a preheated powder mixture. The preheated powder was then subjected to a uniaxial pressure from a hydraulic press causing the powder mixture to apply a pseudoisostatic pressure (400

MPa) on the preform. After sintering the insert was edge rounded to approximately 50 μm.

EXAMPLE 4

Figure 2:
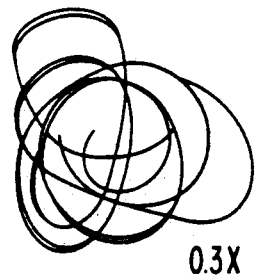
FIG. 2 shows chips obtained when using an insert without chipbreakers in the machining operation of FIG. 1.
Figure 3:
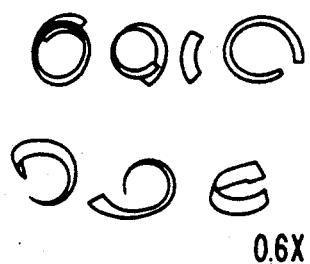
FIG. 3 shows chips obtained when using an insert according to the invention with chipbreakers in the machining operation of FIG. 1.

Inserts from Examples 1, 2 and 3 were used to machine steel SS 2541 (similar to AISI 4337) at a cutting speed of 500 m/min, depth of cut 4 mm and a feed rate of 0.30 mm/rev. The result was as follows:

| Material | Geometry | Tool Life, min | Chip-forming |
| --- | --- | --- | --- |
| $Al_2O_3$—$ZrO_2$ | Special (FIG. 1) | 4 | Good |
| $Al_2O_3$—$TiN_w$ | SNGN 120412 | 17 | Bad (FIG. 2) |
| $Al_2O_3$—$TiN_w$ | Special (FIG. 1) | 18 | Good (FIG. 3) |

The $Al_2O_3$-$ZrO_2$ material gave a good chip-forming a very short time, then suddenly the insert broke probably due to lack of thermal shock resistance. The $Al_2O_3$-$TiN_w$ material could withstand the high cutting speed without fracturing and tool life was determined by flank wear (tool life criterium 0.3 mm). However, the ground CNGA-geometry produced long continuous chips (FIG. 2) which is why the product is not suitable for CNC-machines. The $Al_2O_3$-$TiN_w$ material in the specially designed geometry showed both a long tool life and a good chipbreaking capability (FIG. 3), making the product suitable for highly automated production in CNC-machines.

EXAMPLE 5 (Comparative)

A mixture of $Al_2O_3$ and 7.5 weight % SiC-whiskers, a material that can be pressureless sintered, was preformed into a specially designed geometry (FIG. 4 and FIG. 8) for grooving and then pressureless sintered at 1600° C. in nitrogen. A reinforcement land with width 0.15 mm was ground on the edge line.

EXAMPLE 6 (Comparative)

A mixture of $Al_2O_3$ and 25 weight % SiC-whiskers, a material that cannot be pressureless sintered, was uniaxially hot pressed at 1850° C. into a billet, and then cut into suitable blank sizes, for grinding a grooving insert N 150.23-0952 08 T01020 (Ref: Sandvik Coromant C-1000:213-ENG).

EXAMPLE 7

Figure 4:
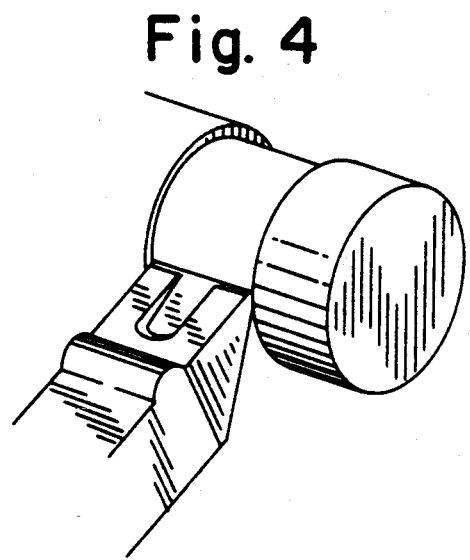
FIG. 4 shows a grooving operation.

A mixture of $Al_2O_3$ and 25 weight % SiC-whiskers, was uniaxially cold pressed to a preform for a special geometry (FIG. 4). The preform was heated in nitrogen at 700° C. to remove pressing agents. The pore system of the preform was then evacuated using vacuum which was applied to the preform with the aid of a suction cup during dipping in a slurry of mainly boron nitride as disclosed in the above-mentioned patent application. After coating of all sides of the preform and drying another dipping in a slurry of boron nitride mixed with alumina and silicon carbide still using vacuum was preformed in order to create an intermediate layer which will prevent glass from reacting with the preform during glass encapsulated HIP-sintering. The application of vacuum prevents from damages in the intermediate layer due to leaking out of entrapped gas. After drying, the preform was embedded in glass powder and heated in a vessel. When the glass melted an Ar-pressure of 200 MPa was applied at a temperature of 1550° C. After HIP-sintering the glass encapsulation was removed and a reinforcement land of width 0.20 mm was ground on the cutting edge.

EXAMPLE 8

Figure 5:
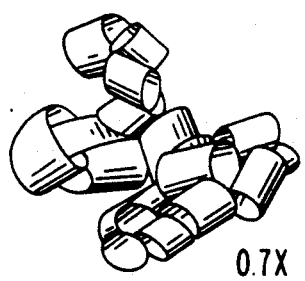
FIG. 5 shows chips obtained when using an insert without chipbreakers in the machining operation of FIG. 4.
Figure 6:
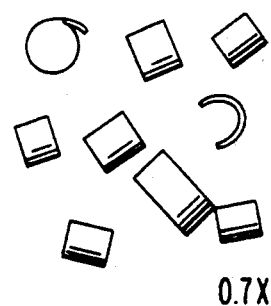
FIG. 6 shows chips obtained when using an insert according to the invention with chipbreakers in the machining operation of FIG. 4.

The inserts from Examples 5, 6, and 7 were used to machine a groove in a bar of a heat resistant material Iconel 718. The cutting speed was 200 m/min and the feed rate 0.15 mm/rev and the depth of the groove was 15 mm. The result was as follows:

| Material | Geometry | Tool Life, min | Chip-forming |
| --- | --- | --- | --- |
| $Al_2O_3$-7.5 $SiC_w$ | Special (FIG. 4) | 0.2 | Good |
| $Al_2O_3$-25 $SiC_w$ | N 150.23 | 5 | Bad (FIG. 5) |
| $Al_2O_3$-25 $SiC_w$ | Special (FIG. 4) | 5 | Good (FIG. 6) |

$Al_2O_3$-7.5% $SiC_w$ could not machine Iconel 718 in this special grooving operation due to lack of sufficient toughness and strength. Total insert fracture occurred after a very short machining time. $Al_2O_3$-25% $SiC_w$ had sufficient strength and toughness for this operation but only the variant with direct formed chipbreakers gave satisfactory chip formation.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. Ceramic cutting tool insert for chip-cutting machining comprising a body of generally polygonal or round shape having an upper face, an opposite face and at least one clearance face intersecting the said upper and lower faces to define cutting edges, the ceramic material comprising alumina and 25–35 volume % single crystal whiskers and/or platelets of carbides, nitrides and/or borides of Si, Ti, Zr, Hf, Ta and/or Nb or solid solutions thereof, non-plane chip-forming surfaces of the insert comprising recessions and elevations formed in an uniaxial cold pressing operation.

2. A cutting insert of claim 1 wherein the final shape and dimensions of said chip-forming surfaces are formed during a sintering operation following the said uniaxial cold pressing operation without any essential subsequent grinding operation.

3. A cutting insert of claim 1 wherein said upper surface is provided with a chip-shaping groove confined by rib means extending longitudinally away from said cutting edge.

4. A cutting insert of claim 3 wherein said rib means comprises a pair of oppositely disposed spaced apart ribs.

5. A cutting insert of claim 3 wherein said rib means comprises a pair of oppositely disposed spaced apart ribs, and a central rib located between said ribs.

6. A cutting insert of claim 3 wherein a land surface is provided between said cutting edge and said chipbreaking groove.

7. A cutting insert of claim 3 wherein at least one circular or semicircular projections are arranged in said chipbreaking groove to enable a chip to be satisfactorily broken over wide ranges of depth of cut and feed.

8. A cutting insert of claim 7 wherein there is provided a row of projections positioned substantially parallel to adjacent cutting edges.

9. A method of making a cutting insert comprising forming a cutting insert blank from a mixture comprising alumina and 25–35 volume % of single crystal whiskers and/or platelets of carbides, nitrides and/or borides of Si, Ti, Zr, Hf, Ta nd/or Nb or solid solutions thereof by a uniaxial cold pressing operation and sintering in an isostatic pressing operation using gas as a pressure transmitting medium while the insert is encapsulated in a glass coating impermeable to the gas.

10. A method of cutting steel or heat resistant alloys wherein a cutting tool comprising alumina and 25–35 volume % of single crystal whiskers and/or platelets of carbides, nitrides and/or borides of Si, Ti, Zr, Hf, Ta nd/or Nb or solid solutions thereof is brought into contact with a steel or heat resistant alloy workpiece and at least one of the cutting tool and workpiece moves relative to the other whereby material is removed by the cutting too from the steel or heat resistant alloy workpiece, said cutting tool containing non-plane chip-forming surfaces comprising recessions and elevations, said non-plane chip-forming surfaces being formed in a uniaxial cold pressing operation.

* * * * *